United States Patent
Moch et al.

(10) Patent No.: US 7,849,210 B2
(45) Date of Patent: *Dec. 7, 2010

(54) OPTIMIZING THE RESPONSIVENESS AND THROUGHPUT OF A SYSTEM PERFORMING PACKETIZED DATA TRANSFERS

(75) Inventors: Andrew B. Moch, Austin, TX (US); Aaron T. Rossetto, Austin, TX (US); Brent C. Schwan, Austin, TX (US); Glen O. Sescila, III, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/341,438

(22) Filed: Dec. 22, 2008

(65) Prior Publication Data

US 2009/0100201 A1    Apr. 16, 2009

Related U.S. Application Data

(63) Continuation of application No. 11/186,183, filed on Jul. 21, 2005.

(51) Int. Cl.
*G06F 15/16* (2006.01)

(52) U.S. Cl. .................. 709/236; 709/229; 709/235; 370/235; 370/252

(58) Field of Classification Search .......... 709/236, 709/229; 370/235, 252, 376; 725/100
See application file for complete search history.

(56) References Cited

U.S. PATENT DOCUMENTS

| | | | |
|---|---|---|---|
| 4,774,707 A * | 9/1988 | Raychaudhuri | ............. 370/447 |
| 5,101,477 A | 3/1992 | Casper et al. | |
| 5,452,432 A * | 9/1995 | Macachor | ................... 710/22 |
| 5,987,530 A | 11/1999 | Thomson | |
| 6,006,289 A * | 12/1999 | James et al. | .................. 710/35 |
| 6,021,129 A | 2/2000 | Martin et al. | |
| 6,073,205 A | 6/2000 | Thomson | |
| 6,157,972 A | 12/2000 | Newman et al. | |
| 6,377,530 B1 * | 4/2002 | Burrows | .................. 369/59.21 |
| 6,393,493 B1 | 5/2002 | Madden et al. | |
| 6,412,028 B1 | 6/2002 | Steed et al. | |
| 6,590,897 B1 | 7/2003 | Lauffenburger et al. | |
| 6,718,412 B2 | 4/2004 | Purcell et al. | |

(Continued)

*Primary Examiner*—Saleh Najjar
*Assistant Examiner*—Waseem Ashraf
(74) *Attorney, Agent, or Firm*—Meyertons Hood Kivlin Kowert & Goetzel, P.C.; Jeffrey C. Hood; Mark S. Williams

(57) ABSTRACT

A mechanism for managing packetized data transfers in a system including a transmitting and a receiving device. The transmitting device may transmit data to the receiving device in a plurality of packets, each packet a predetermined number of data bytes wide. The transmitting device may include a transfer count unit to maintain a data transfer count based on a number of transmitted data bytes. The receiving device may program the transmitting device with a transfer count mark, which may be a number that corresponds to a specific count of the data transfer count. The transmitting device may calculate a difference between the data transfer count and the transfer count mark. If the difference between the transfer count and the transfer count mark is less than the predetermined number, the transmitting device may transmit a short data packet having less than the predetermined number of data bytes to the receiving device.

32 Claims, 7 Drawing Sheets

U.S. PATENT DOCUMENTS

| | | |
|---|---|---|
| 6,748,466 B2 | 6/2004 | Leete |
| 6,990,550 B2 | 1/2006 | Hesse et al. |
| 7,035,948 B1 * | 4/2006 | Liang et al. .................... 710/56 |
| 7,106,696 B1 * | 9/2006 | Lim et al. ................. 370/230.1 |
| 7,266,621 B2 | 9/2007 | Leete |
| 7,304,959 B1 * | 12/2007 | Swaroop et al. ............. 370/252 |
| 7,349,973 B2 * | 3/2008 | Saito et al. .................. 709/229 |
| 7,359,405 B2 | 4/2008 | Chan et al. |
| 7,359,996 B2 | 4/2008 | Saito et al. |
| 7,409,471 B2 | 8/2008 | Saito et al. |
| 7,428,600 B2 | 9/2008 | Saito et al. |
| 7,450,509 B2 | 11/2008 | Hao |
| 7,471,700 B2 | 12/2008 | Moon et al. |
| 7,477,604 B2 | 1/2009 | Moon et al. |
| 2002/0178310 A1 * | 11/2002 | Nozaki ....................... 710/240 |
| 2004/0086000 A1 | 5/2004 | Wallace et al. |
| 2004/0105438 A1 * | 6/2004 | Moon et al. .................. 370/389 |
| 2004/0228285 A1 * | 11/2004 | Moon et al. .................. 370/252 |
| 2005/0105469 A1 * | 5/2005 | Hao .......................... 370/235 |
| 2005/0152350 A1 * | 7/2005 | Sung et al. ................... 370/376 |
| 2006/0271982 A1 * | 11/2006 | Gallou et al. ................ 725/100 |

* cited by examiner

OPTIMIZING THE RESPONSIVENESS AND THROUGHPUT OF A SYSTEM PERFORMING PACKETIZED DATA TRANSFERS

CONTINUATION DATA

This application is a continuation of U.S. patent application Ser. No. 11/186,183, titled "METHOD AND APPARATUS FOR OPTIMIZING THE RESPONSIVENESS AND THROUGHPUT OF A SYSTEM PERFORMING PACKETIZED DATA TRANSFERS USING A TRANSFER COUNT MARK," filed Jul. 21, 2005, whose inventors were Andrew B. Moch, Aaron T. Rossetto, Brent C. Schwan, and Glen O. Sescila III, and which is hereby incorporated by reference in its entirety.

BACKGROUND OF THE INVENTION

1. Field of the Invention

This invention relates to data transfer methodologies between devices and, more particularly, to management of packetized data transfers.

2. Description of the Related Art

Various systems transfer data between devices in data packets. For example, a data acquisition system may implement packetized data transfer methodologies between a data acquisition device and a host computer via USB. Also, in a local area network, a first computer system may transfer data packets to a second computer system via Ethernet.

In a data acquisition system, a data acquisition device may transfer a data packet to a host computer after it has acquired a predetermined number of data bytes. The data acquisition device may accumulate the acquired data in an acquisition buffer until it can transmit a data packet having the predetermined number of data bytes. For example, the data acquisition device may send data packets of 512 bytes to the host computer. The host computer may store the data received from the data acquisition device to provide the data to a user for data analysis.

In some cases, a user may request the data acquisition system to acquire a specific amount of data for analysis. As described above, the data acquisition device typically accumulates acquired data until it can send a data packet having a predetermined number of data bytes. In various instances, the aggregation of data in the acquisition buffer may introduce latency in the acquisition operation, which may reduce the responsiveness of the system. For example, the last few bytes of the requested data may have been acquired and stored in the acquisition buffer, but the data acquisition device may not send the requested data to the host computer until the predetermined number of bytes have been acquired. In this example, the user may have to wait a significant amount of time, especially if the speed of the data acquisition is slow. Also, the latency may be significant if the data acquisition is bursty. Furthermore, during this period of time, the host computer may waste processing power if it continuously polls the data acquisition device for the requested data when it is not available. Once the host computer receives the request data from the data acquisition device, the data may be aggregated once again in a receive buffer of the host computer, which may introduce additional latency into the acquisition operation and further reduce the responsiveness of the system.

SUMMARY OF THE INVENTION

Various embodiments of a mechanism for managing packetized data transfers in a system are disclosed. In one embodiment, a system (e.g., a data acquisition system) may implement packetized data transfer methodologies between a transmitting device (e.g., a data acquisition device) and a receiving device (e.g., a host computer). In this embodiment, the transmitting device may acquire data from a source and transmit the acquired data to the receiving device in a plurality of packets. Each of the data packets may be a predetermined number of data bytes wide.

The transmitting device may include a transfer count unit to maintain a data transfer count based on a number of transmitted data bytes. The data transfer count may be a down counter that may indicate the number of data bytes remaining to be transmitted. In one embodiment, the receiving device may program the transmitting device with a transfer count mark in response to a user directive to acquire a desired number of data bytes. The transfer count mark may be a number that corresponds to a specific count of the data transfer count. In other words, the transfer count mark may mark a specific count of the data transfer count that corresponds to the last data byte of the data requested by the user. The transmitting device may calculate a difference between the data transfer count and the transfer count mark. If the difference is greater than or equal to the predetermined number, the transmitting device may transmit a max packet having the predetermined number of data bytes to the receiving device. If the difference between the data transfer count and the transfer count mark is less than the predetermined number, the transmitting device may transmit a short data packet having less than the predetermined number of data bytes to the receiving device. In other embodiments, the transmitting device may notify the receiving device that the requested data is available for the user by alternative means.

In one embodiment, the transmitting device may also include an additive transfer count unit. The receiving device may determine whether the data transfer count is at or below a threshold level during a continuous data acquisition operation. If the data transfer count is at or below the threshold level, the receiving device may program the additive transfer count unit of the transmitting device to update the data transfer count of the transfer count unit. If the data transfer count is updated, the receiving device may also update the transfer count mark accordingly.

Figure 1:
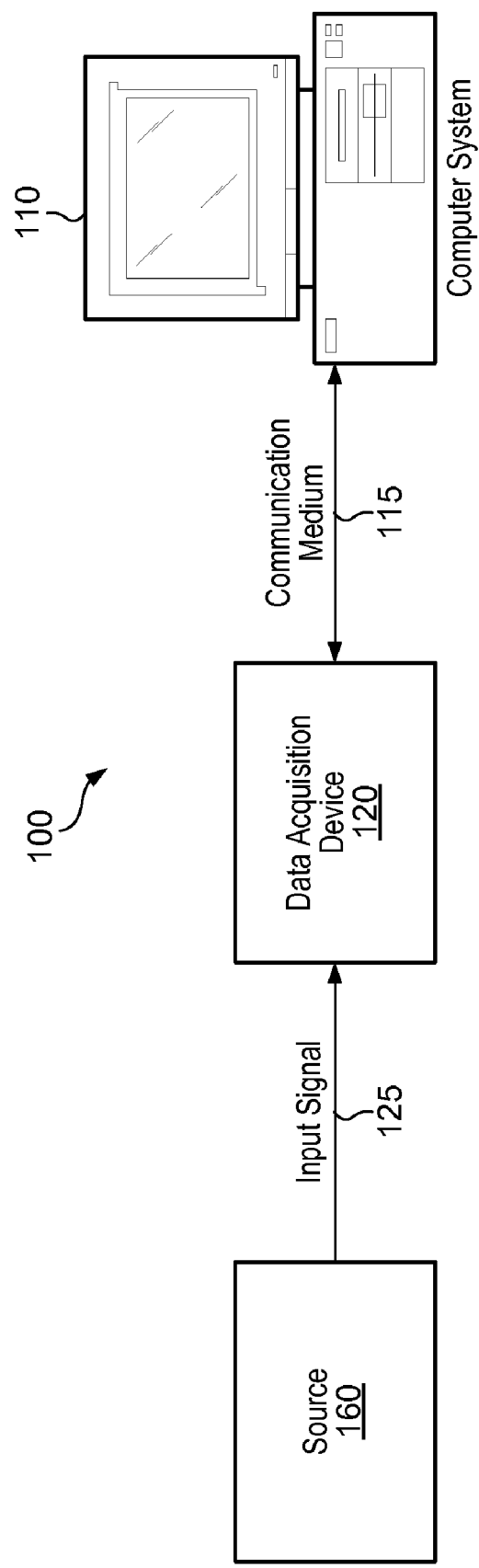
FIG. 1 is a diagram of one embodiment of a computer-based measurement system or data acquisition system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Data Acquisition System

FIG. 1 is a diagram of one embodiment of a computer-based measurement system or data acquisition system 100. In the illustrated embodiment, the data acquisition system 100 includes a computer system 110 (e.g., a host computer) coupled to a data acquisition (DAQ) device 120 via a communication medium 115. The data acquisition system 100 may implement packetized data transfer methodologies between the DAQ device 120 and the computer system 110 to perform data acquisition operations.

The DAQ device 120 may be an internal card or board coupled to a bus, e.g., a Peripheral Component Interconnect (PCI), PCI Express, Industry Standard Architecture (ISA), or Extended Industry Standard Architecture (EISA) bus, but is shown external to the computer 110 for illustrative purposes. The DAQ device 120 may also be an external device coupled to the computer system 110. In this embodiment, the communication medium 115 may be a serial bus, such as Universal Serial Bus (USB), IEEE 1394, Ethernet, or a proprietary bus, or a parallel bus such as General Purpose Interface Bus (GPIB) or others. It is noted that the communication medium 115 may be a wired or wireless communication medium.

In the depicted embodiment, the DAQ device 120 may be connected to an external source 160, such as an instrument, sensor, transducer, or actuator, from which the DAQ device 120 may receive an input signal 125, e.g., an analog input such as sensor data. In one example, the external source 160 may be a temperature sensor included in a unit under test (UUT). In this example, the DAQ device 120 may receive a temperature reading from the temperature sensor and convert the analog data to digital form to be sent to the computer system 110 for analysis. Additionally, the DAQ device 120 may receive a digital input, e.g., a binary pattern, from the external source 160. Furthermore, the computer system 110 and the DAQ device 120 may also produce analog or digital signals, e.g., for stimulating a UUT.

The computer system 110 may control the DAQ device 120. For example, the computer system 110 may direct the DAQ device 120 to perform an acquisition, and may obtain data from the DAQ device 120 for storage and analysis therein. Additionally, the computer system 110 may send data to the DAQ device 120 for various purposes, such as for use in generating analog signals to stimulate a UUT.

The computer system 110 may be any of various types of computing or processing systems, including a personal computer system (PC), mainframe computer system, server system including a plurality of server blades, workstation, network appliance, Internet appliance, personal digital assistant (PDA), or other device or combinations of devices. The computer system 110 may include a processor, which may be any of various types, including an x86 processor, e.g., a Pentium™ class, a PowerPC™ processor, a CPU from the SPARC™ family of RISC processors, as well as others. Also, the computer system 110 may include one or more memory subsystems (e.g., Dynamic Random Access Memory (DRAM) devices). The memory subsystems may collectively form the main memory of computer system 110 from which programs primarily execute. The main memory may be operable to store a user application and a driver software program. The user application may be executable by the processor to conduct the data acquisition/generation process. The driver software program may be executable by the processor to receive data acquisition/generation tasks from the user application and program the DAQ device 120 accordingly.

It should be noted that the components described with reference to FIG. 1 are meant to be exemplary only, and are not intended to limit the invention to any specific set of components or configurations. For example, in various embodiments, one or more of the components described may be omitted, combined, modified, or additional components included, as desired. For instance, the system 100 may be included in a local area network (LAN) and may include a first and a second computer system connected via Ethernet. In addition, as will be described further below with reference to FIGS. 6A and 6B, system 100 may be other types of systems, e.g., a motion control system.

Packetized Data Transfer Mechanism

Figure 2:
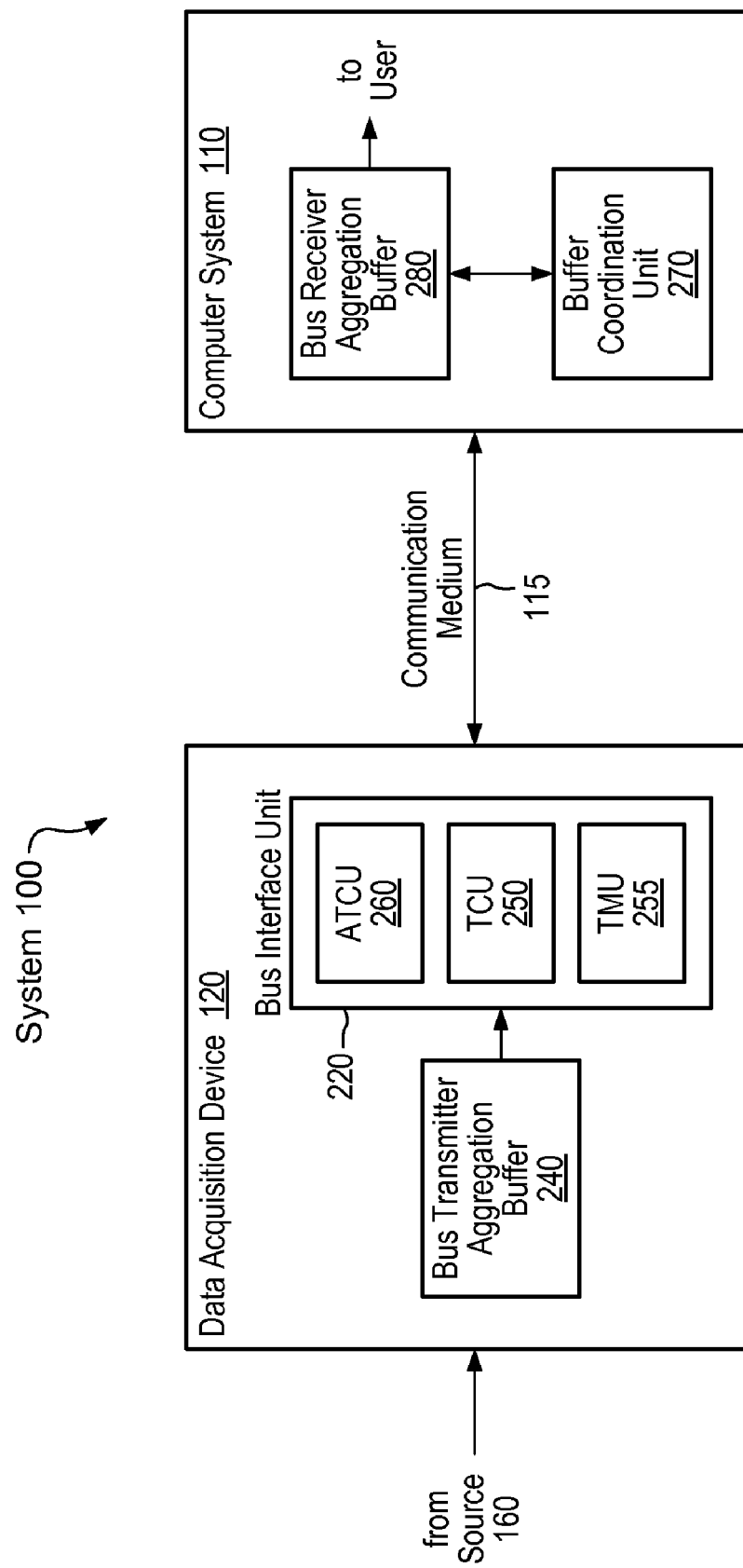
FIG. 2 is a block diagram of one embodiment of the data acquisition system including a mechanism for managing packetized data transfers during data acquisition operations.

FIG. 2 is a block diagram of one embodiment of the data acquisition system 100 including a mechanism for managing packetized data transfers during data acquisition operations. In the depicted embodiment, the DAQ device 120 includes a bus transmitter aggregation buffer 240 and a bus interface unit 220. The bus interface unit 220 includes a transfer count unit (TCU) 250, a transfer mark unit (TMU) 255, and an additive transfer count unit (ATCU) 260. The computer system 110 includes a bus receiver aggregation buffer 280 and a buffer coordination unit 270. As described above, the DAQ device 120 may be connected to the computer system 110 via the communication medium 115, e.g., USB or Ethernet, among others. This mechanism for managing packetized data transfers may optimize the responsiveness of the data acquisition system 100 as well as throughput and CPU utilization, as will be described further below.

The bus transmitter aggregation buffer 240 of the DAQ device 120 may be used to accumulate data received from a source (e.g., source 160 of FIG. 1). The bus receiver aggregation buffer 280 of the computer system 110 may be used to accumulate data received from the DAQ device 120, which may be read by the user of the data acquisition system 100 for analysis purposes. It is noted however that in other embodiments the data stored in the bus receiver aggregation buffer 280 may be provided to other devices, e.g., for further processing.

The transfer count unit 250 may maintain a data transfer count based on the number of data bytes transmitted from the DAQ device 120 to the computer system 110. The transfer count unit 250 may decrement the data transfer count for every data byte that is transmitted from the DAQ device 120 to the computer system 110. Therefore, the data transfer count may be indicative of the number of data bytes remaining to be transmitted. The additive transfer count unit 260 may be used to update the data transfer count of the transfer count unit 250.

The transfer mark unit 255 may be used to mark a particular count of the data transfer count to determine when to send short packets. The functionally of the transfer count unit 250, the additive transfer count unit 260, and the transfer mark unit 255 will be described further below.

It should be noted that the components described with reference to FIG. 2 are meant to be exemplary only, and are not intended to limit the invention to any specific set of components or configurations. For example, in one embodiment, the system 100 may be included in a network, e.g., a local area network (LAN), and may include a first and a second computer system (or additional computer systems and devices) transmitting data packets via Ethernet. Furthermore, in various embodiments, one or more of the components described may be omitted, combined, modified, or additional components included, as desired. For instance, in some embodiments, the additive transfer count unit 260 and the transfer count unit 250 may be replaced by a single transfer count unit. Also, in other embodiments, the computer system 110 may include a plurality of aggregation buffers to store data received from the DAQ device 120.

Figure 3:
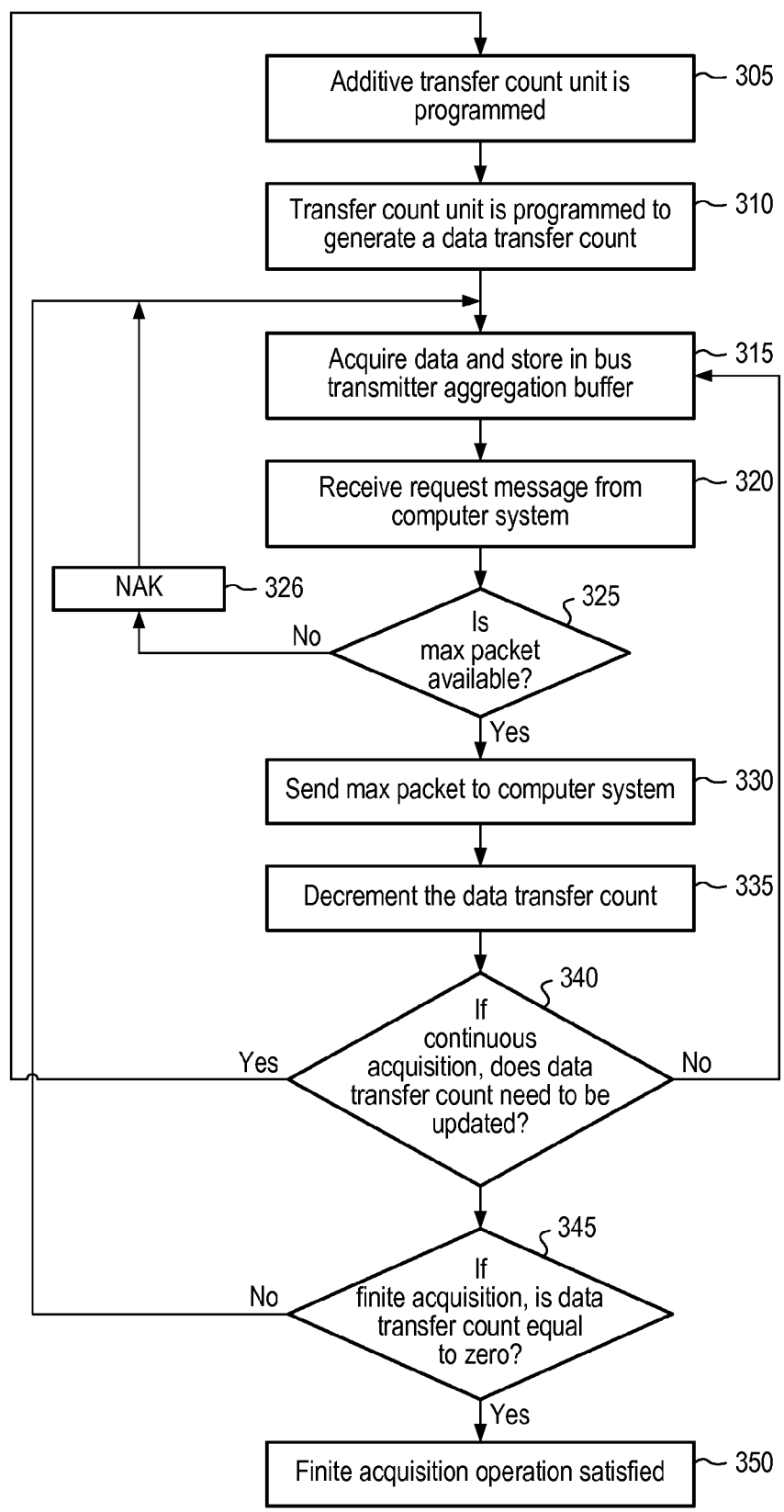
FIG. 3 is a flow diagram illustrating a method for managing packetized data transfers at the data acquisition device during finite and continuous data acquisition operations, according to one embodiment.

FIG. 3 is a flow diagram illustrating a method for managing packetized data transfers at the DAQ device 120 during finite and continuous data acquisition operations, according to one embodiment. It should be noted that in various embodiments, some of the steps shown may be performed concurrently, in a different order than shown, or omitted. Additional steps may also be performed as desired.

Referring collectively to FIG. 3 and FIG. 2, in response to receiving a user directive, the computer system 110 may begin to acquire data from a source (e.g., source 160 of FIG. 1) via the data acquisition device 120. The user directive may specify a finite data acquisition operation or a continuous data acquisition operation. In block 305, the additive transfer count unit 260 is programmed based on whether the user specifies the number of data bytes (or data samples) to be acquired. In a finite data acquisition, the user may specify the number of data bytes to acquire and the additive transfer count unit 260 may be programmed based on that specific number. For example, the user may specify the acquisition of one million data bytes and, in response to this user directive, the additive transfer count unit 260 may be programmed to indicate the number of data bytes to be acquired (e.g., one million). If the user specifies a continuous acquisition, the user may not need to specify a number of data bytes to be acquired. Instead, the computer system 110 may select a number of data bytes and the additive transfer count unit 260 may be programmed based on the number selected by the computer system 110. For example, the computer system 110 may program the additive transfer count 260 with a large number, e.g., two million. It is noted however that the computer system 110 may program the additive transfer count 260 with any number, e.g., the specific number selected by the computer system 110 may be programmable.

The additive transfer count unit 260 may then program the transfer count unit 250 based on the programmed number to generate the data transfer count, as indicated in block 310. For example, if the programmed number indicates that one million data bytes are going to be acquired, then a data transfer count starting at one million may be generated. In one embodiment, the transfer count unit 250 may include a down counter to maintain the data transfer count. The transfer count unit 250 may decrement the data transfer count based on the number of data bytes transmitted from the DAQ device 120 to the computer system 110. It is noted however that in some embodiments the transfer count unit 250 may include an up counter to maintain the data transfer count.

During the communication between the DAQ device 120 and the computer system 110, the DAQ device 120 may begin acquiring data from the source and storing the data in the bus transmitter aggregation buffer 240, as indicated in block 315. The DAQ device 120 may be configured to transmit data in packets of a predetermined size, i.e., a predetermined number of data bytes wide. These packets of a predetermined maximum size may be referred as max packets. For example, the max packets may be 512 bytes wide. It is noted that the predetermined number may be programmable.

The bus transmitter aggregation buffer 240 may be configured to accumulate data packets of the predetermine size, i.e., max packets. The DAQ device 120 may receive a request message from the computer system 110 requesting the acquired data, as indicated in block 320. In block 325, the DAQ device 120 may monitor the bus transmitter aggregation buffer 240 to detect when a max packet has been accumulated therein. If a max packet is available, the DAQ device 120 may transmit a max packet to the computer system 110, as indicated in block 330. If the bus transmitter aggregation buffer 240 has not accumulated a max packet, the DAQ device 120 may respond to the computer system 110 with a negative acknowledgement (NAK) message (block 326) and may continue to acquire data (block 315). In one embodiment, the computer system 110 may regularly poll the DAQ device for data using the request messages. It is noted however that in other embodiments (e.g., an Ethernet system) the system may not implement a polling process.

After the DAQ device transmits a max packet to the computer system 110 (block 330), the transfer count unit 250 may decrement the data transfer count (block 335). The transfer count unit 250 may down count the data transfer count by the predetermined number, which may correspond to the predetermined number of data bytes that are sent in a max packet. For example, if the data transfer count is at one million (1,000,000) and the max packet is 512 bytes wide, the data transfer count may be decremented to 999,488 after the transfer of the max packet.

In one embodiment, if the data acquisition operation is continuous, the computer system 110 may determine whether the data transfer count of the transfer count unit 250 needs to be updated, as indicated in block 340. In a continuous operation, the data transfer count may need to be updated to prevent the count from reaching zero. The computer system 110 may detect whether the data transfer count is at or below a threshold level to determine whether the data transfer count needs to be updated. For example, the threshold level may be a count of one million. If the data transfer count is above the threshold level, the DAQ device 120 may continue to acquire data (block 315). If the data transfer count is at or below the threshold, the computer system 110 may program the additive transfer count unit 260, as indicated in block 305. As described above, since it is a continuous operation, the computer system 110 may select the number of data bytes and the additive transfer count unit 260 may be programmed based on the number selected by the computer system 110. For example, the computer system 110 may program the additive transfer count 260 with a large number, e.g., one million. The additive transfer count unit 260 may then program the transfer count unit 250 to update the data transfer count based on the programmed number, as indicated in block 310. For example, one million may be added to the data transfer count of the transfer count unit 250 to update the data transfer count. Updating the data transfer count may prevent the count from decrementing to zero during a continuous data acquisition operation.

If it is a finite data acquisition operation, the computer system 110 may detect whether the data transfer count of the transfer count unit 250 is equal to zero, as indicated in block 345. If the data transfer count is equal to zero, the finite data acquisition operation has been satisfied (block 350) and therefore the operation may be stopped. If the data transfer count is greater than zero, the DAQ device 120 may continue to acquire data, as indicated in block 315.

It is noted that, in various embodiment, the transfer count unit 250 and the additive transfer count unit 260 are implemented in software. In some embodiment, the transfer count unit 250 and the additive transfer count unit 260 are implemented in hardware. In yet other embodiment, the transfer count unit 250 and the additive transfer count unit 260 are implemented in both hardware and software. Furthermore, in still other embodiments, the DAQ device 120 may not include the additive transfer count unit 260; therefore the computer system 110 may directly program the transfer count unit 250.

Figure 4:
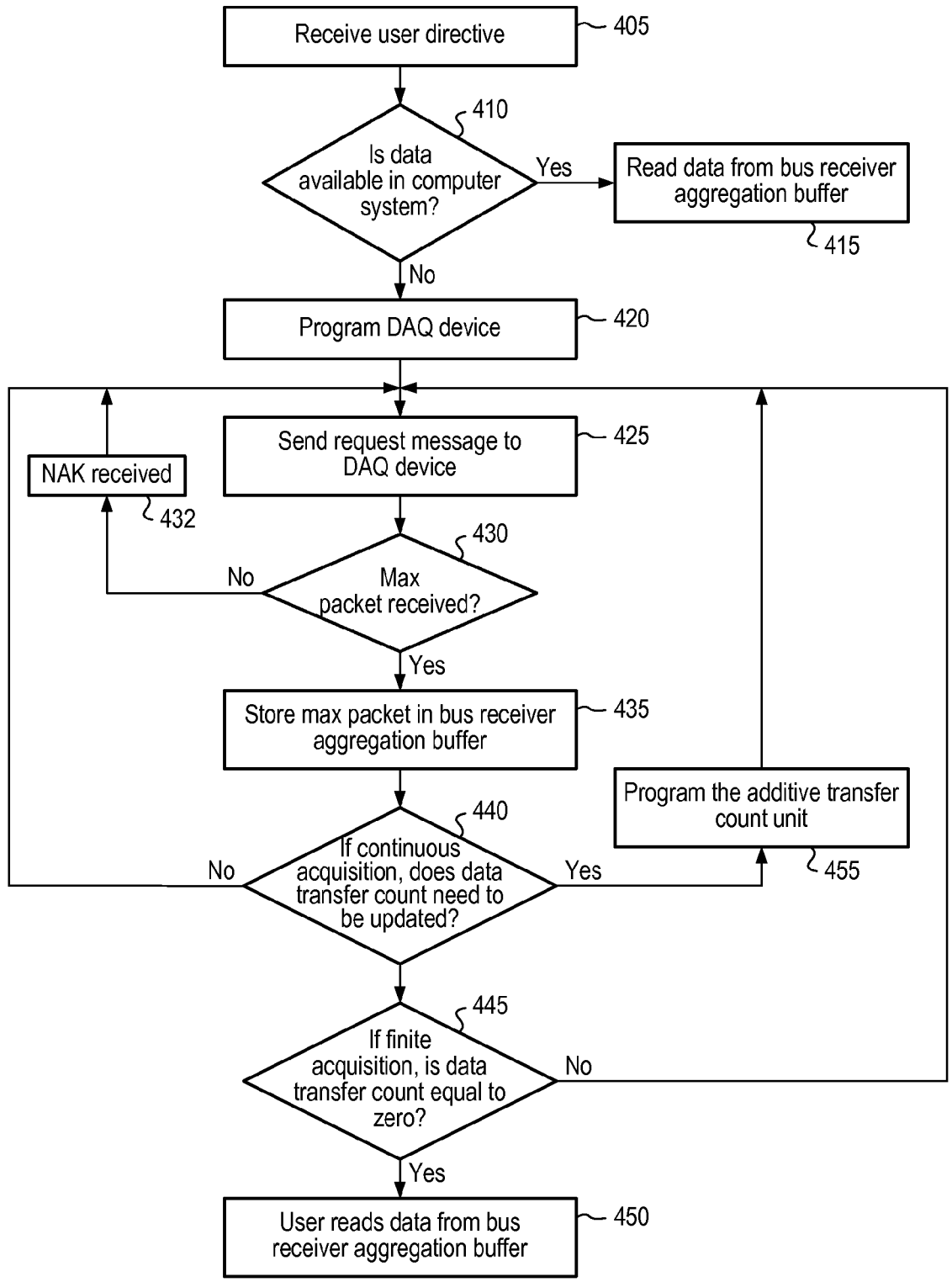
FIG. 4 is a flow diagram illustrating a method for managing packetized data transfers at the computer system during finite and continuous data acquisition operations, according to one embodiment.

FIG. 4 is a flow diagram illustrating a method for managing packetized data transfers at the computer system 110 during finite and continuous data acquisition operations, according to one embodiment. It should be noted that in various embodiments, some of the steps shown may be performed concurrently, in a different order than shown, or omitted. Additional steps may also be performed as desired.

Referring collectively to FIG. 4 and FIG. 2, the computer system 110 may receive a user directive to initiate a finite or continuous data acquisition operation, as indicated in block 405. First, the computer system 110 may determine whether the data the user needs has already been acquired and is being stored within the computer system 110, as indicated in block 410. For example, the data may be located in the bus receiver aggregation buffer 280. If the data is available in the computer system 110, the user reads the data, e.g., from the bus receiver aggregation buffer 280 to analyze the data (block 415). In block 420, if the data is not available, the computer system 110 may program the DAQ device 120 to acquire the data from the source (e.g., the source 160 of FIG. 1), as described above. The computer system 110 may send a request message to the DAQ device 120 to request a max packet, as indicated in block 425.

In block 430, the computer system may determine whether a max packet was received from the DAQ device 120. In one embodiment, if a max packet is not received and instead a NAK messaged is received (block 432), then another request message may be sent to the DAQ device 120 (block 425). The computer system 110 may regularly poll the DAQ device 120 using request messages. If a max packet is received, the computer system 110 may store the max packet in bus receiver aggregation buffer 280, as indicated in block 435.

In block 440, if the data acquisition operation is continuous, the computer system 110 may then determine whether the data transfer count of the transfer count unit 250 needs to be updated, as was described above with reference to FIG. 3. In a continuous operation, the data transfer count may need to be updated to prevent the count from reaching zero. If the data transfer count needs to be updated (i.e., if the data transfer count is at or below the threshold), the computer system 110 may program the additive transfer count unit 260, as indicated in block 455. If the data transfer count does not need to be updated (i.e., if the data transfer count above the threshold), the computer system 110 may continue sending request messages to the DAQ device 120 (block 425).

In block 445, if the data acquisition operation is finite, the computer system 110 may detect whether the data transfer count of the transfer count unit 250 is equal to zero, as described above with reference to FIG. 3. If the data transfer count is equal to zero, the finite data acquisition operation has been satisfied and the user may read the data from the bus receiver aggregation buffer 280, e.g., to analyze the data (block 450). If the data transfer count is greater than zero, the computer system 110 may continue sending request messages to the DAQ device 120 (block 425).

Transfer Count Mark

Figure 5:
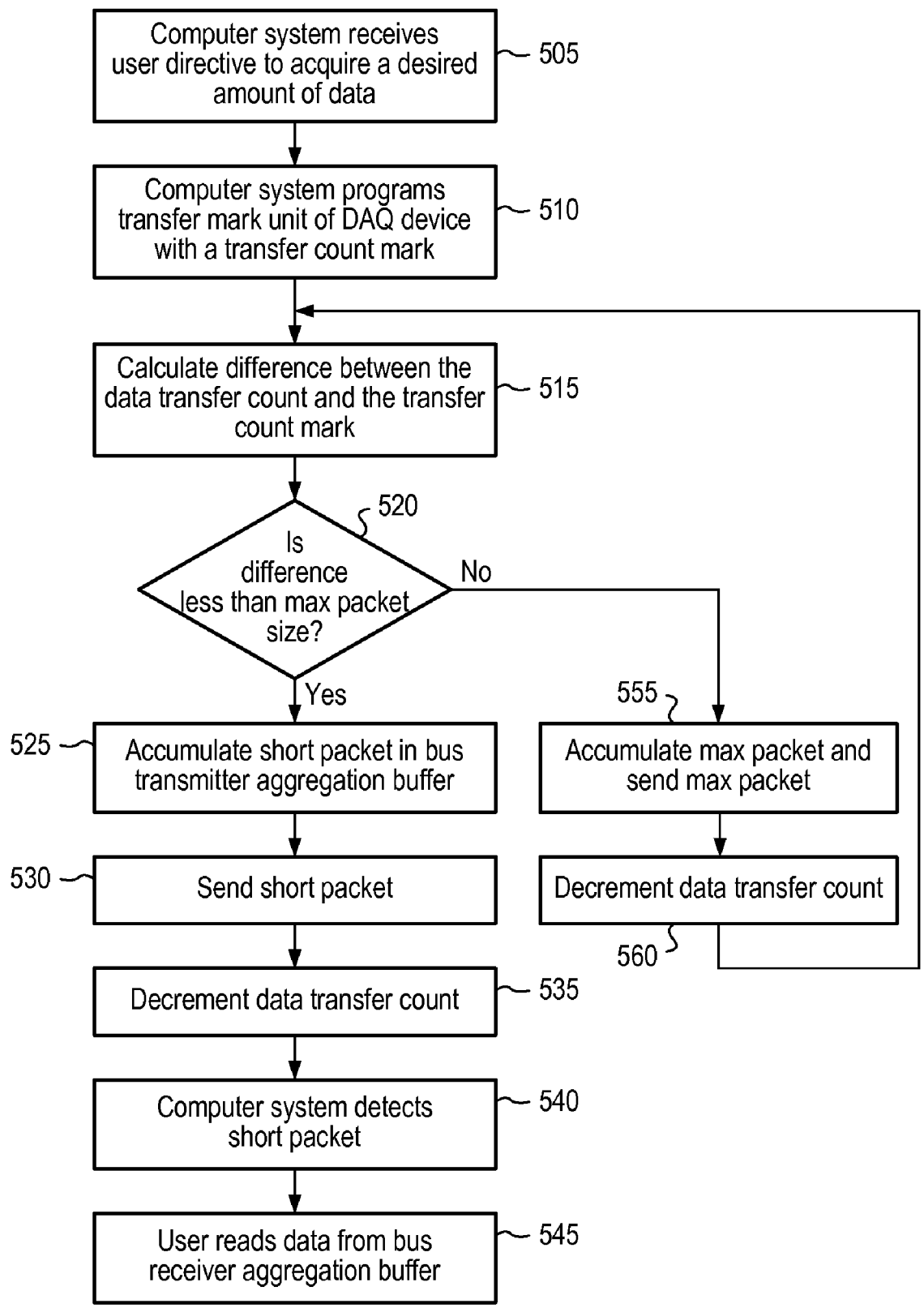
FIG. 5 is a flow diagram illustrating a method for managing packetized data transfers in the data acquisition system during finite and continuous data acquisition operations using a transfer count mark, according to one embodiment.

FIG. 5 is a flow diagram illustrating a method for managing packetized data transfers in the data acquisition system 100 during finite and continuous data acquisition operations using a transfer count mark, according to one embodiment. It should be noted that in various embodiments, some of the steps shown may be performed concurrently, in a different order than shown, or omitted. Additional steps may also be performed as desired.

Referring collectively to FIG. 5 and FIGS. 2-4, during the data acquisition operation, the computer system 110 may receive a user directive to acquire a desired amount of data, as indicated in block 505. For example, the computer system 110 may receive the user directive at any time during the process described in FIGS. 3 and 4. Whether the current data acquisition operation is finite or continuous, the user may be interested in analyzing a particular number of data bytes immediately. First, the computer system 110 may determine whether it has the desired data. If the buffer 280 has the data, then the user may read the data from the bus receiver aggregation buffer 280 to satisfy the user directive. If the bus receiver aggregation buffer 280 does not have the data, the computer system 110 may program the transfer mark unit 255 with a transfer count mark, as indicated in block 510. The transfer count mark may be a number that corresponds to a specific count of the data transfer count of the transfer count unit 250. The transfer count mark may mark a specific count of the data transfer count that corresponds to the last data byte of the data requested by the user. Therefore, at any point in time, the computer system 110 and/or the DAQ device 120 may calculate the number of data bytes remaining to be acquired to satisfy the user directive by subtracting the transfer count mark from the data transfer count. It is noted that the transfer mark unit 255 may be implemented in software and/or hardware.

In block 515, the DAQ device 120 may calculate the difference between the data transfer count and the transfer count mark. The DAQ device 120 may determine whether the difference is less than the max packet size, i.e., the predetermined number. This calculation may determine whether the DAQ device 120 continues to accumulate data or immediately sends the stored data to the computer system 110. If the difference is greater than or equal to the max packet size, the DAQ device 120 may continue to accumulate a max packet at the bus transmitter aggregation buffer 240 and then send the max packet to the computer system 110, as indicated in block 555. After the max packet is sent to the computer system 110, the data transfer count of the transfer count register 250 may be decremented by the predetermined number (block 560), and then the DAQ device 120 may again perform the difference calculation (block 515). In one embodiment, the DAQ device 120 may calculate the difference between the data transfer count and the transfer count mark after the data transfer count is updated following each max packet transmission. It is noted however that in other embodiments the calculation may be performed at various times during the data acquisition operation.

If the difference between the data transfer count and the transfer count mark is less than the max packet size, the bus transmitter aggregation buffer 240 of the DAQ device 120 may accumulate a short packet having a size that corresponds to the difference between the data transfer count and the transfer count mark, as indicated in block 525. For example, if the max packet size is 512 data bytes and the difference between the data transfer count and the transfer count mark is 256, the bus transmitter aggregation buffer 240 may accumulate a short packet of 256 data bytes. The difference being less than the max packet size indicates that less than the predetermined number of data bytes are necessary to satisfy the user directive. It is noted that the difference being less than the max packet size includes the difference being zero.

After the bus transmitter aggregation buffer 240 accumulates the short packet, the DAQ device 120 may send the short packet to the computer system 110, as indicated in block 530. If the difference between the data transfer count and the transfer count mark is zero, no accumulation may be needed and the DAQ device 120 may send the computer system 110 a short packet having zero data bytes, i.e., a zero-length packet. In block 535, the data transfer count is decremented after the short packet is transmitted to the computer system 110 by an amount equal to the size of the short packet.

The computer system 110 may receive the short packet and may detect the fact that it received a packet having less than the predetermined number of data bytes, as indicated in block 540. After detecting a short packet, the computer system 110 may notify the user that that it has received the requested data. Then, in block 545, the user may read the requested data from the bus receiver aggregation buffer 280, e.g., to analyze the data.

It is noted that in other embodiments, if the difference between the data transfer count and the transfer count mark is less than the max packet size, the DAQ device 120 may notify the computer system 110 that the requested data is available for the user by other means instead of or in addition to sending a short packet. The DAQ device 120 may transmit a notification to the computer system 110 indicating that the requested number of data bytes have been acquired. In one embodiment, the notification may be an interrupt, for example.

Using a transfer count mark to indicate when to send short packets may optimize the responsiveness of the system 100, in addition to optimizing throughput and CPU utilization, especially during a continuous data acquisition operation. During the data acquisition process and before a short packet is received, the throughput may be maximized and the CPU load may be dropped to very low levels. When a short packet is received, the system 100 may be responsive and send the short packet to the computer system 110 quickly.

In a continuous data acquisition operation, when the computer system 110 programs the additive transfer count unit 260 to update the data transfer count of the transfer count unit 250, the transfer mark unit 255 may also need to be updated. Since the transfer count mark corresponds to a specific count of the data transfer count, if the data transfer count is updated with a particular number, e.g., the data transfer count is incremented by the particular number, then the transfer count mark may also be updated with the same number. For example, if the data transfer count is at two million and the transfer count mark is set at one million, and if additive transfer count unit 260 updates the data transfer count by one million to three million, then the transfer count mark may also be updated by one million to two million. The transfer count mark of the transfer mark unit 255 may be updated to correspond to the correct count of the data transfer count so that the user still receives the desired data.

In some embodiments, the computer system 110 may regularly program the transfer mark unit 255 with a transfer count mark. For example, the computer system 110 may continuously program the transfer mark unit 255 to return every two thousand bytes of data acquired. In this example, after a short packet is sent (as described above) to satisfy the first request for two thousand data bytes, the computer system 110 may again program the transfer mark unit 255 to send the next two thousand data bytes. It is noted that in other embodiments the computer system 110 may program the transfer mark unit 255 to send a different number of data bytes each time. It is noted that in various embodiments software and/or hardware in the DAQ device 120 may program the transfer mark unit 255 independent of the computer system 110.

As illustrated in FIG. 2, the computer system 110 may include a buffer coordination unit 270 to control the communications between the DAQ device 120 and the computer system 110. Furthermore, the buffer coordination unit 270 may control the transmission of data between the bus receiver aggregation buffer 280 and other entities. It is noted that the buffer coordination unit 270 may be implemented in software and/or hardware.

The computer system 110 may monitor the data transfer count of the transfer count unit 250, the transfer count mark of the transfer mark unit 255, and the additive transfer count unit 260. In one embodiment, the buffer coordination unit 270 of the computer system 110 may perform the monitoring. The computer system 110 may keep track of the data transfer count and the additive transfer count unit 260 to be able to program the transfer mark unit 255 with the correct transfer count mark. In one embodiment, the computer system 110 may determine how many data bytes have been transmitted from the DAQ device 120. The number of transmitted data bytes may be calculated by summing the total number of additions to the additive transfer count unit 260 and then subtracting the current data transfer count from that total. For example, if the additive transfer count unit 260 has been programmed twice with one million and the current data transfer count is eight hundred thousand, then the total number of transmitted data bytes is one million, two hundred thousand data bytes. In this example, at this point in time, the user may request the system 100 to send one million, five hundred thousand data bytes immediately. Since one million, two hundred thousand data bytes have already been transmitted, the computer system 110 may determine that three hundred thousand additional data bytes are necessary to satisfy the user directive. Also, the computer system 110 may determine that the data transfer count will count down to five hundred thousand when the last data bytes of the three hundred thousand remaining data bytes is transmitted. Therefore, in this example, the computer system 110 may program the transfer mark unit 255 with a transfer count mark of five hundred thousand to correspond to the five hundred thousand count of the data transfer count.

In various embodiments, the additive transfer count unit 260 and transfer count unit 250 may be 32-bit down counters. The data transfer count of the transfer count unit 250 may be a 32-bit signed number that represents the number of data bytes remaining to be sent to the computer system 110. As described above, the data transfer count of the transfer count unit 250 may be initialized and updated by the additive transfer count unit 260. For example, when the data transfer count is decremented to a particular number, the additive transfer count unit 260 may add a signed value to the current data transfer count to update the data transfer count. The 32-bit additive transfer count unit 260 and the transfer count unit 250 may perform 64-bit data acquisition using this additive count technique. It is noted however that in other embodiments the computer system 110 may instead include counter of other sizes, e.g., one or more 64-bit counters.

In some embodiments, the data transfer count of the transfer count unit 250 may indicate the number of data bytes acquired from the source, rather than the number of data bytes transmitted from the DAQ device 120 to the computer system 110. Also, in various embodiments, the transfer count unit 250 may include one or more up counters rather than down counters. In these embodiments, the transfer count unit 250 may increment the data transfer count for every data byte that is transmitted from the DAQ device 120 to the computer system 110, and therefore the data transfer count may be indicative of the number of data bytes that have been currently transmitted.

It is noted that the directives to initiate data acquisition operations and/or to program the transfer mark unit 255 may originate from other sources or management entities besides the user of the computer system 110, for example, by a remote user of LAN or by a software algorithm. As described above, data may be transmitted in packets between the DAQ device 120 (i.e., the transmitting device) and the computer system 110 (i.e., the receiving device). It is noted however that in some embodiments the packetized data transfer methodologies described above with reference to FIGS. 1-5 may also be implemented for data transfers from the computer system 110 to the DAQ device 120. In other embodiments, one or more features described above may be implemented in systems that perform non-packetized data transfers between devices.

Various embodiments may further include receiving, sending or storing instructions and/or data implemented in accordance with the foregoing description upon a computer readable storage medium. Generally speaking, a computer readable storage medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc.

It is noted that the illustrated embodiments of FIGS. 1-5 are meant to be exemplary only, and are not intended to limit the methods disclosed herein to any particular application domain. Rather, the techniques described herein are contemplated for use in a wide variety of applications, e.g., as described below with reference to FIGS. 6A and 6B, including, for example, synchronized motion control, image acquisition, and synchronized modeling and simulation.

Figure 6A:
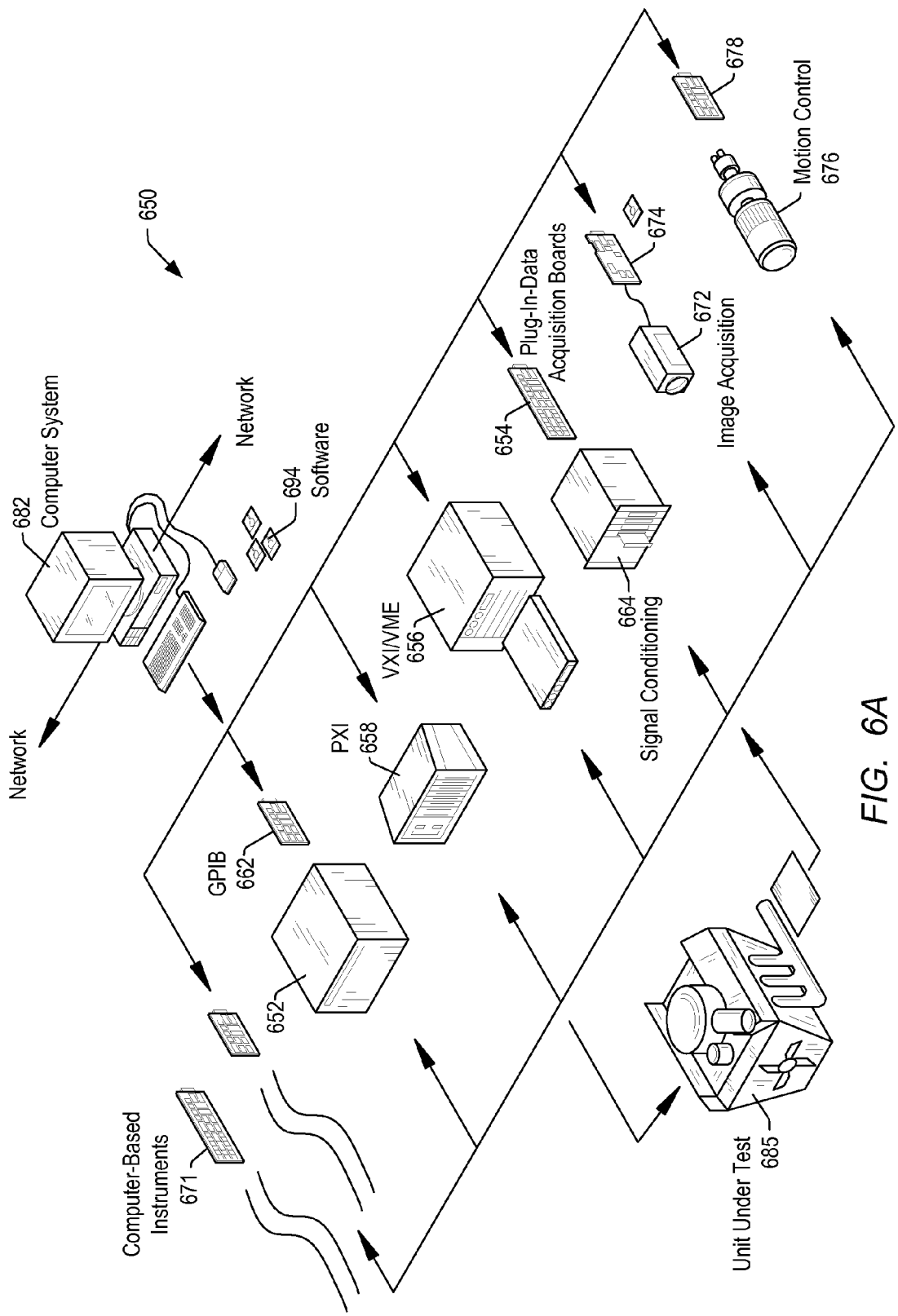
FIG. 6A illustrates an exemplary instrumentation control system, according to one embodiment.

FIG. 6A illustrates an exemplary instrumentation control system 650 which may implement the one or more of the embodiments described above. The system 650 comprises a host computer 682 which connects to one or more instruments. The host computer 682 may comprise a CPU, a display screen, memory, and one or more input devices such as a mouse or keyboard as shown, and the host computer 682 may be part of a network, such as a Local Area Network (LAN). The computer system 682 may operate with the one or more instruments to analyze, measure or control a UUT or process 685. The computer system 682 may also comprise a memory medium(s) on which one or more software programs and/or software components (e.g., software 694) may be stored. The memory medium may also store operating system software, as well as other software for operation of the computer system. Various embodiments further include receiving or storing instructions and/or data implemented in accordance with the foregoing description upon a carrier medium.

The one or more instruments may include a GPIB (General Purpose Interface Bus) instrument 652 and associated GPIB interface card 662, a data acquisition board 654 and associated signal conditioning circuitry 664, a VXI instrument 656, a PXI instrument 658, a video device or camera 672 and associated image acquisition (or machine vision) card 674, a motion control device 676 and associated motion control interface card 678, and/or one or more computer based instrument cards 671, among other types of devices. The computer system may couple to and operate with one or more of these instruments. The instruments may be coupled to a unit under test (UUT) or process 685, or may be coupled to receive field signals, typically generated by transducers. The system 650 may be used in a data acquisition and control application, in a test and measurement application, an image processing or machine vision application, a process control application, a man-machine interface application, a simulation application, or a hardware-in-the-loop validation application, among others.

Figure 6B:
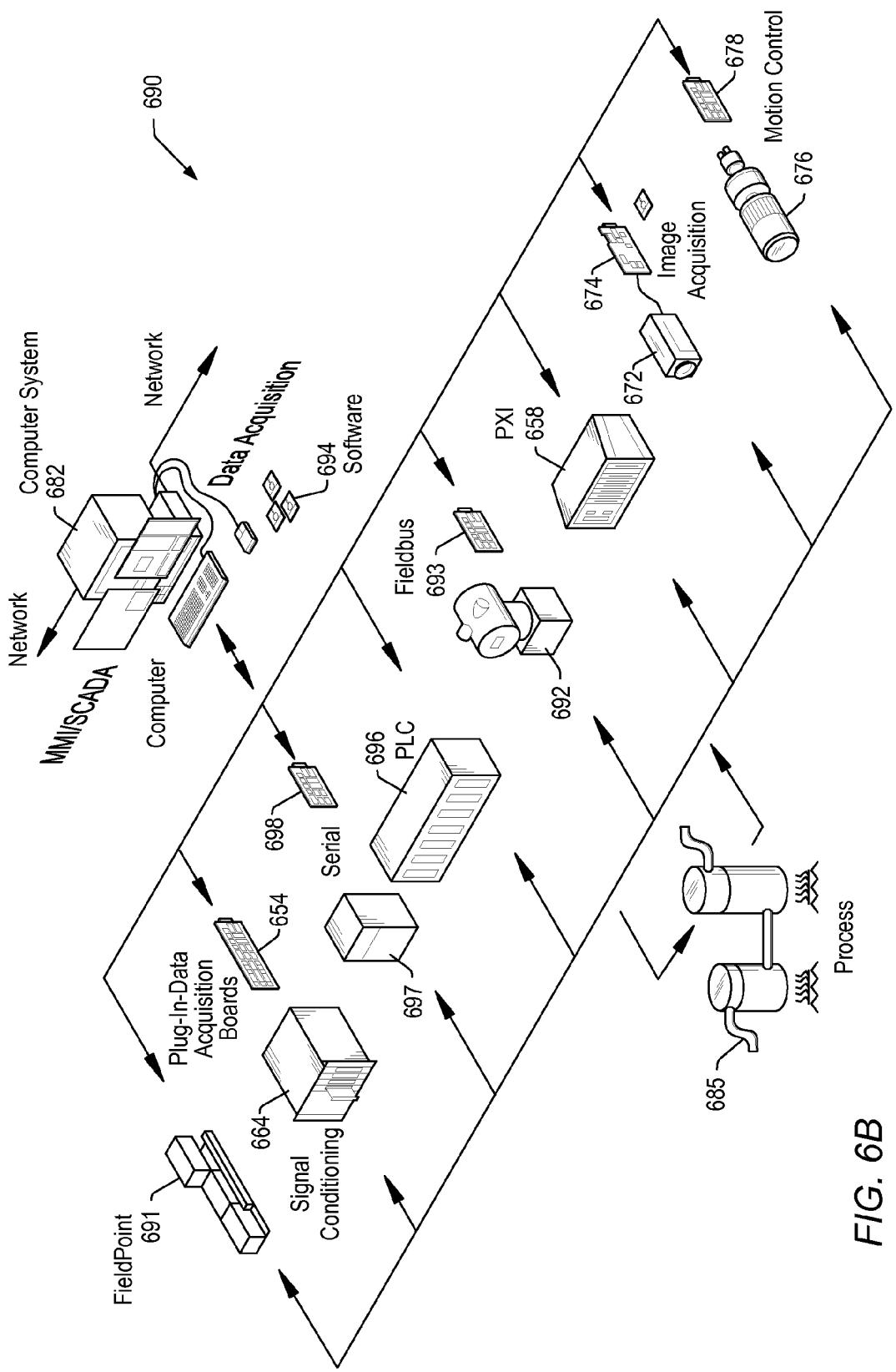
FIG. 6B illustrates an exemplary industrial automation system, according to one embodiment.

FIG. 6B illustrates an exemplary industrial automation system 690 which may implement the one or more of the embodiments described above. The industrial automation system 690 is similar to the instrumentation or test and measurement system 650 shown in FIG. 6A. Elements which are similar or identical to elements in FIG. 6A have the same reference numerals for convenience. The system 690 may comprise a computer 682 which connects to one or more devices (e.g., measurement devices) or instruments. The computer 682 may comprise a CPU, a display screen, memory, and one or more input devices such as a mouse or keyboard as shown. The computer 682 may operate with the one or more devices to a process or device 685 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 654 and associated signal conditioning circuitry 664, a PXI instrument 658, a video device 672 and associated image acquisition card 674, a motion control device 676 and associated motion control interface card 678, a fieldbus device 692 and associated fieldbus interface card 693, a PLC (Programmable Logic Controller) 696, a serial instrument 697 and associated serial interface card 698, or a distributed data acquisition system, such as the Fieldpoint system 691 available from National Instruments, among other types of devices.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a receiving device; and
   a transmitting device configured to transmit data in a plurality of packets to the receiving device, wherein each of the data packets is a predetermined number of data bytes wide, wherein the transmitting device includes a transfer count unit configured to maintain a data transfer count based on a number of transmitted data bytes;
   wherein the receiving device is configured to:
      prior to completion of a data transfer, program the transmitting device with a transfer count mark, wherein the transfer count mark is a number that corresponds to a specific count of the data transfer count, and wherein the transfer count mark specifies a portion of the data to be transferred;
   wherein during the data transfer, the transmitting device is configured to calculate a difference between the data transfer count and the transfer count mark;

wherein, in response to the difference between the data transfer count and the transfer count mark being less than the predetermined number, the transmitting device is configured to transmit a short data packet having less than the predetermined number of data bytes to the receiving device, thereby completing transfer of the portion of the first amount of data; and wherein the transmitting device further comprises an additive transfer count unit, wherein the receiving device is configured to program the additive transfer count unit of the transmitting device with a value indicating additional data to be transferred, wherein in response to said programming the additive transfer count unit is configured to add the value to the data transfer count.

2. The system of claim 1, wherein, in response to the difference between the data transfer count and the transfer count mark being greater than or equal to the predetermined number, the transmitting device is configured to transmit a packet having the predetermined number of data bytes to the receiving device.

3. The system of claim 1, wherein the transfer count unit is configured to decrement the data transfer count for every data byte that is transmitted from the transmitting device to the receiving device, wherein the data transfer count is indicative of a number of data bytes remaining to be transmitted from the transmitting device to the receiving device.

4. The system of claim 3, wherein the transmitting device is configured to calculate the difference between the data transfer count and the transfer count mark after the data transfer count is decremented following each data packet transmission.

5. The system of claim 1, wherein the transfer count unit is configured to increment the data transfer count for every data byte that is transmitted from the transmitting device to the receiving device, wherein the data transfer count is indicative of a number of data bytes that have been transmitted from the transmitting device to the receiving device.

6. The system of claim 1, wherein the difference between the data transfer count and the transfer count mark being less than the predetermined number includes the difference being zero, wherein in response to the difference being zero the transmitting device is configured to send a short data packet having zero data bytes to the receiving device.

7. The system of claim 1, wherein the transmitting device includes a bus transmitter aggregation buffer configured to store data acquired by the transmitting device, wherein:
  in response to the difference between the data transfer count and the transfer count mark being greater than or equal to the predetermined number, the bus transmitter aggregation buffer is configured to accumulate the predetermined number of data bytes for transmission of a data packet to the receiving device; and
  in response to the difference between the data transfer count and the transfer count mark being less than the predetermined number, the bus transmitter aggregation buffer is configured to accumulate less than the predetermined number of data bytes for transmission of a short packet to the receiving device.

8. The system of claim 7, wherein, in response to the difference between the data transfer count and the transfer count mark being less than the predetermined number, the bus transmitter aggregation buffer is configured to accumulate a number of data bytes equal to the difference between the data transfer count and the transfer count mark for transmission of a short packet to the receiving device.

9. The system of claim 1, wherein, in response to the receiving device receiving a short packet having less than the predetermined number of data bytes from the transmitting device, the receiving device is configured to notify a management entity that the requested number of data bytes have been acquired.

10. The system of claim 1, wherein the predetermined number of bytes is programmable.

11. The system of claim 1,
wherein the receiving device is further configured to:
  prior to completion of the data transfer perform, program the transmitting device with at least one successive transfer count mark, wherein the at least one successive transfer count mark is another number that corresponds to a respective specific count of the data transfer count, and wherein the at least one successive transfer count mark specifies a respective portion of the first amount of data;
wherein during the data transfer, the transmitting device is further configured to calculate a difference between the data transfer count and the at least one successive transfer count mark; and
wherein, in response to the difference between the data transfer count and the at least one successive transfer count mark being less than the predetermined number, the transmitting device is configured to transmit a short data packet having less than the predetermined number of data bytes to the receiving device, thereby completing transfer of the respective portion of the first amount of data.

12. The system of claim 1, wherein the transmitting device is configured to send data packets to the receiving device via USB.

13. The system of claim 1, wherein the transmitting device is configured to send data packets to the receiving device via Ethernet.

14. The system of claim 1, wherein the system is a data acquisition system, the transmitting device is comprised in a data acquisition device, and the receiving device is comprised in a host computer system.

15. A transmitting device configured to transmit data in a plurality of packets to a receiving device, the transmitting device comprising:
  a transfer count unit configured to maintain a data transfer count based on a number of transmitted data bytes, wherein each of the plurality of data packets is a predetermined number of data bytes wide; and
  a transfer mark unit configured to store a transfer count mark, wherein the transfer count mark is a number that corresponds to a specific count of the data transfer count;
  wherein the transmitting device is configured to:
    transfer data to the receiving device;
  wherein, prior to completion of the data transfer, the transmitting device is further configured to:
    be programmed by the receiving device, thereby setting the transfer count mark, wherein the transfer count mark specifies a portion of the data to be transferred;
  wherein during the data transfer, the transmitting device is configured to:
    calculate a difference between the data transfer count and the transfer count mark;
  wherein, in response to the difference between the data transfer count and the transfer count mark being less than the predetermined number, the transmitting device is configured to send a short data packet having less than the predetermined number of data bytes to the receiving device, thereby completing transfer of the portion of the data to be transferred; and wherein the transmitting device further comprises an additive transfer count unit, wherein the additive transfer count unit is configured to be programmed by the receiving device with a value indicating additional data to be transferred, wherein in response to said programming the additive transfer count unit is configured to add the value to the data transfer count.

16. The transmitting device of claim 15, wherein the transmitting device is comprised in a data acquisition device, and wherein the receiving device is comprised in a host computer system.

17. A method for managing packetized data transmissions between a receiving device and a transmitting device, the method comprising:
the transmitting device transmitting data in a plurality of packets to the receiving device, wherein each of the data packets is a predetermined number of data bytes wide;
the transmitting device maintaining a data transfer count based on a number of transmitted data bytes;
prior to completion of the data transmission, the receiving device programming the transmitting device with a transfer count mark, wherein the transfer count mark is a number that corresponds to a specific count of the data transfer count, and wherein the transfer count mark specifies a portion of the first amount of data;
during the data transfer, the transmitting device calculating a difference between the data transfer count and the transfer count mark; and
in response to the difference between the data transfer count and the transfer count mark being less than the predetermined number, the transmitting device transmitting a short data packet having less than the predetermined number of data bytes to the receiving device, thereby completing transfer of the portion of the data;
wherein the transmitting device comprises an additive transfer count unit, the method further comprising:
the receiving device programming the additive transfer count unit of the transmitting device with a value indicating additional data to be transferred; and
in response to said programming, the additive transfer count unit adding the value to the data transfer count.

18. The method of claim 17, further comprising, in response to the difference between the data transfer count and the transfer count mark being greater than or equal to the predetermined number, the transmitting device transmitting a packet having the predetermined number of data bytes to the receiving device.

19. The method of claim 17, further comprising decrementing the data transfer count for every data byte that is transmitted from the transmitting device to the receiving device, wherein the data transfer count is indicative of a number of data bytes remaining to be transmitted from the transmitting device to the receiving device.

20. The method of claim 19, wherein said calculating the difference between the data transfer count and the transfer count mark is performed after the data transfer count is decremented following each data packet transmission.

21. The method of claim 17, wherein the difference between the data transfer count and the transfer count mark being less than the predetermined number includes the difference being zero, wherein, in response to the difference being zero, said transmitting a short packet comprises transmitting a short data packet having zero data bytes to the receiving device.

22. The method of claim 17, further comprising:
storing data acquired by the transmitting device in a bus transmitter aggregation buffer;
in response to the difference between the data transfer count and the transfer count mark being greater than or equal to the predetermined number, the bus transmitter aggregation buffer accumulating the predetermined number of data bytes for transmission of a data packet to the receiving device; and
in response to the difference between the data transfer count and the transfer count mark being less than the predetermined number, the bus transmitter aggregation buffer accumulating less than the predetermined number of data bytes for transmission of a short packet to the receiving device.

23. The method of claim 17, further comprising, in response to the receiving device receiving a short packet having less than the predetermined number of data bytes from the transmitting device, the receiving device notifying a management entity that the requested number of data bytes have been acquired.

24. A method for transferring data to a receiving device, the method comprising:
the transmitting device transmitting data in a plurality of packets to the receiving device, wherein each of the data packets is a predetermined number of data bytes wide, wherein the transmitting device includes a transfer count unit configured to maintain a data transfer count based on a number of transmitted data bytes;
during the data transfer, and in response to the receiving device programming the transmitting device with a transfer count mark prior to completion of the data transfer, wherein the transfer count mark is a number that corresponds to a specific count of the data transfer count, and wherein the transfer count mark specifies a portion of the data to be transferred, the transmitting device calculating a difference between the data transfer count and the transfer count mark; and
in response to the difference between the data transfer count and the transfer count mark being less than the predetermined number, the transmitting device transmitting a notification to the receiving device indicating that the portion of the data has been acquired; and
wherein the transmitting device comprises an additive transfer count unit, the method further comprising:
the receiving device programming the additive transfer count unit of the transmitting device with a value indicating additional data to be transferred; and
in response to said programming, the additive transfer count unit adding the value to the data transfer count.

25. The method of claim 24, wherein said transmitting a notification to the receiving device indicating that the portion of the data has been acquired comprises:
transmitting a short data packet having less than the predetermined number of data bytes to the receiving device, thereby completing transfer of the portion of the first amount of data.

26. The system of claim 1, wherein the data transfer comprises a finite data transfer, and wherein the receiving device is further configured to:
request a first amount of data to be transferred to the receiving device from the transmitting device, wherein the data transfer is performed in response to the request.

27. The system of claim 1, wherein the data transfer comprises a continuous data transfer.

28. The system of claim 1, the receiving device is further configured to:
repeat said programming the transmitting device one or more times prior to completion of the data transfer.

29. The system of claim 1, wherein the data transfer comprises a finite data transfer, wherein the receiving device is further configured to receive user input specifying a finite amount of data to transfer in the finite data transfer, and wherein to program the additive transfer count unit of the transmitting device with the value, the receiving device is configured to:

program the additive transfer count unit with the value one or more times to specify transfer of a corresponding one or more portions of the finite amount of data.

30. The transmitting device of claim 15, wherein the data transfer comprises a finite data transfer, wherein the receiving device is further configured to receive user input specifying a finite amount of data to transfer in the finite data transfer, and wherein to be programmed by the receiving device with the value, the additive transfer count unit of the transmitting device is programmed with the value one or more times to specify transfer of a corresponding one or more portions of the finite amount of data.

31. The method of claim 17, wherein the data transfer comprises a finite data transfer, wherein the method further comprises:

the receiving device receiving user input specifying a finite amount of data to transfer in the finite data transfer;

wherein said programming the additive transfer count unit of the transmitting device with the value comprises:

programming the additive transfer count unit with the value one or more times to specify transfer of a corresponding one or more portions of the finite amount of data.

32. The method of claim 24, wherein the data transfer comprises a finite data transfer, the method further comprising:

the receiving device receiving user input specifying a finite amount of data to transfer in the finite data transfer;

wherein said programming the additive transfer count unit of the transmitting device with the value comprises:

programming the additive transfer count unit with the value one or more times to specify transfer of a corresponding one or more portions of the finite amount of data.

* * * * *